United States Patent [19]

Fujikawa et al.

[11] 4,272,085

[45] Jun. 9, 1981

[54] CYLINDER HEAD GASKET FOR A LIQUID COOLED INTERNAL COMBUSTION ENGINE

[75] Inventors: Tetsuzo Fujikawa; Michio Nishimura, both of Kobe, Japan

[73] Assignee: Kawasaki Jukogyo Kabushiki Kaisha, Kobe, Japan

[21] Appl. No.: 81,590

[22] Filed: Oct. 3, 1979

[30] Foreign Application Priority Data

Oct. 7, 1978 [JP] Japan .......................... 53-138482[U]
Oct. 7, 1978 [JP] Japan .......................... 53-138483[U]
Oct. 7, 1978 [JP] Japan .......................... 53-138484[U]

[51] Int. Cl.³ ............................................. F16J 15/12
[52] U.S. Cl. ................................ 277/235 B; 277/180; 277/234; 277/236
[58] Field of Search .......... 277/235 B, 235 R, 235 A, 277/234, 180, 188 A, 236

[56] References Cited

U.S. PATENT DOCUMENTS

| 1,928,116 | 9/1933 | Stephens ..................... 277/235 B X |
| 1,980,335 | 11/1934 | Hewitt et al. ...................... 277/180 |
| 2,681,241 | 6/1954 | Aubers ......................... 277/235 B X |
| 3,191,950 | 6/1965 | Hiltner .............................. 277/235 X |
| 3,473,813 | 10/1969 | Meyers et al. ............... 277/235 B X |
| 3,549,157 | 12/1970 | Bennigsen .................... 277/235 B X |
| 3,586,338 | 6/1971 | Miklau .......................... 277/235 B X |
| 3,606,361 | 9/1971 | Pohl et al. ........................ 277/235 B |
| 3,794,333 | 2/1974 | Czernik et al. ...................... 277/180 |
| 3,811,689 | 5/1974 | Farnam ......................... 277/235 B X |
| 3,863,936 | 2/1975 | Farnam et al. ............... 277/235 B X |

FOREIGN PATENT DOCUMENTS

| 6616470 | 5/1967 | Netherlands ............................ 277/180 |
| 323075 | 12/1929 | United Kingdom ................. 277/235 B |

Primary Examiner—Robert S. Ward, Jr.
Attorney, Agent, or Firm—Jordan and Hamburg

[57] ABSTRACT

A cylinder head gasket for internal combustion engine, which comprises a gasket body formed with hole for combustion chambers and holes for coolant passages is disclosed, in which protruded portions of high thermal conductivity metal whose thickness is larger than the thickness of the gasket body are provided around the hole for combustion chamber and elastic seal members whose thickness is larger than the thickness of the protruded portions are provided around each of the holes for coolant passages. The gasket body may be made of a metal of high thermal conductivity. In case where the gasket body is made of a material permeable to liquid, the seal members may be provided such that they cover peripheral walls of the holes for coolant passages, respectively.

7 Claims, 15 Drawing Figures

CYLINDER HEAD GASKET FOR A LIQUID COOLED INTERNAL COMBUSTION ENGINE

BACKGROUND OF THE INVENTION

The present invention relates to a gasket and more particularly to a cylinder head gasket adapted to be disposed between a cylinder block and a cylinder head of a liquid cooled internal combustion engine.

The cylinder head gasket of the type mentioned above which is formed with at least one hole for a combustion chamber and at least one hole for a liquid coolant passage is known. In the conventional gasket of this type, a thin metal grommet is mounted on the peripheral edge portion of the hole for the combustion chamber to seal the latter when the gasket is incorporated in between the cylinder head and the cylinder block. Since the grommet is made from a thin metal sheet, the grommet tends to be easily broken. In order to eliminate this disadvantage of the conventional gasket, it has been usual to make the grommet of a material such as steel or stainless steel which has a considerable mechanical strength. In this case, however, another problem arises that the grommet is abnormally overheated to an extent that the normal running of the engine becomes impossible. That is, since the gasket body of the gasket is made of asbestos whose thermal conductivity is low and the material such as steel or stainless steel used is also low in thermal conductivity, the heat radiation from the grommet becomes insufficient.

In order to clarify the above disadvantage and other disadvantages of the conventional gasket, one example of the latter will be described with reference to FIG. 1.

The typical example of the conventional cylinder head gasket has a structure as shown, in cross section. The gasket body 1 of the cylinder head gasket is of asbestos and is formed with a hole 2 for a combustion chamber and holes 3 for liquid coolant passages. On a peripheral edge of the hole 2 of the gasket body 1 a grommet 4 provided by bending a thin metal plate to form an outwardly U-shaped cross section is attached such that the peripheral portion of the hole 2 is pinched between the legs of the U-shape. The cylinder head gasket is disposed in between a cylinder block 5 and a cylinder head 6. The grommet 4 is exposed to the combustion chamber of the engine and the holes 3 for the coolant passages are connected to openings of coolant chambers (not shown) of the cylinder head and the cylinder block. In this gasket structure, there are three problems which are listed below.

(1) The grommet 4 is made from a thin metal sheet. Therefore, when the engine is ignited, a large pressure due to an explosion of fuel is exerted on an outer surface 4b of a bent portion 4a of the grommet 4. Due to a compressive component of force generated by the pressure, which is in the thickness direction (vertical direction in FIG. 1) of the cylinder head gasket and acts particularly on outer peripheral face 4b of the bent portion 4a, a cracking is created in the bent portion 4a, causing the grommet 4 to be broken. When the grommet 4 is broken, the sealing function thereof may become unreliable.

(2) The breakdown of the grommet 4 is a very important problem for a high power internal combustion engine. In order to overcome this problem the grommet 4 must be formed of a material such as stainless steel or steel which has a high mechanical strength. This is important when the grommet 4 is used in a high power internal combustion engine. Such material, however, has a relatively low thermal conductivity. Furthermore, since the grommet 4 is prepared from a thin sheet of such material, the amount of heat transmission thereof is also relatively small. Of course, the thermal conductivity of asbestos is very low. Therefore, when the engine is ignited, the temperature of the grommet 4 becomes abnormally high. Due to this fact, there may be a possibility that the grommet 4 itself functions as an ignitor causing the operation of the internal combustion engine to be unstable. Further, there may be a possibility that the cylinder block and/or the cylinder head will melt due to the abnormally high temperature of the grommet 4, causing the engine to be broken.

(3) The gasket must function to gas-seal the combustion chamber of the engine by means of the grommet 4 disposed in between the cylinder block 5 and the cylinder head 6 and must function to liquid-seal the coolant chamber of the engine. However, it is difficult to determine the dimensions of the gasket body and the grommet 4 of the gasket so as to satisfy both sealing requirements simultaneously.

SUMMARY OF THE INVENTION

Therefore, an object of the present invention is to provide a cylinder head gasket for a liquid cooled internal combustion engine, which can effectively dissipate heat and reliably function to gas-seal and liquid-seal simultaneously.

Another object of the present invention is to provide a gasket by which the coolant in the coolant chamber of the engine is prevented from diffusing from an inner peripheral surface of the gasket body defining a hole for the coolant passage into the gasket body to thereby prevent the leakage of the coolant in the coolant chamber and make the liquid sealing reliable.

According to the invention, there is provided, a cylinder head gasket to be disposed between a cylinder block and a cylinder head of a liquid cooled interal combustion engine, comprising a gasket body formed with at least one hole for a combustion chamber of the engine and at least one hole for a coolant passage, protruded portions of a metal having relatively high thermal conductivity, said protruded portions being disposed around a peripheral wall of said hole for the combustion chamber such that they protrude vertically from opposite surfaces of said gasket body and adapted to be in pressure contact with the cylinder block and the cylinder head, and a seal member of an elastic and liquid impermeable material, said seal member being fixed to and arranged on opposite surfaces of said gasket body around said hole for the coolant passage, said seal member protruding vertically from said opposite surfaces of said gasket body, and the height of said seal member being larger than that of said protruded portions.

Other objects and features of the present invention will be apparent in the description of the preferred embodiments.

DETAILED DESCRIPTION OF THE PREFERRED EMBODIMENTS

Figure 2:
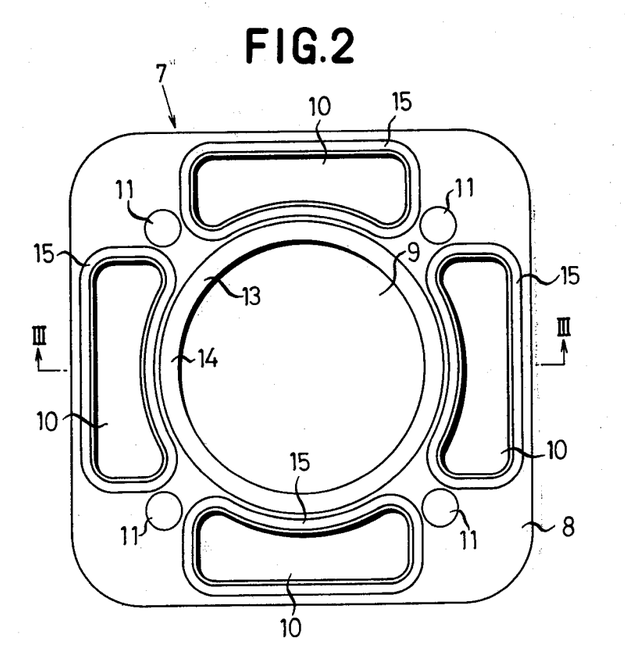
FIG. 2 is a plan view of an embodiment of the present invention.
Figure 3:
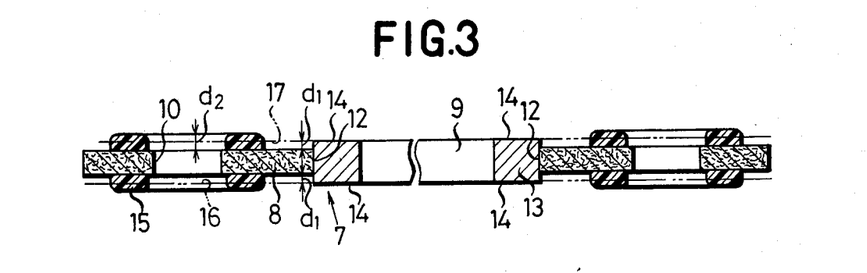
FIG. 3 is a cross section taken along a line III—III in FIG. 2.

FIG. 2 is a plan view of a cylinder head gasket according to the present invention and FIG. 3 is a cross section of the gasket taken along the line III—III in FIG. 2. A gasket body 8 of the cylinder head gasket 7 is made of a material such as asbestos whose thermal conductivity is relatively small. The gasket body 8 is formed with a hole 9 for a combustion chamber and a plurality (four in the shown embodiment) of holes 10 for liquid coolant passages disposed in the outside of the hole 9. The cylinder head gasket 7 is adapted to be fixedly secured under pressure in between the cylinder block and the cylinder head by means of bolts (not shown) passed through bolt holes 11.

A ring 13 of a metal such as copper or aluminum whose thermal conductivity is relatively large is fixedly secured to a whole inner peripheral surface 12 of the hole 9 for the combustion chamber of the gasket body 8. The ring 13 is thicker than the gasket body 8 so that it protrudes from each of an upper and lower end faces of the gasket body 8 by a distance $d_1$. Therefore, protruded portions 14 each of which extends around the peripheral surface 12 of the hole 9 and protrudes from each of the upper and lower end faces of the gasket body 8 by $d_1$ are provided.

On the upper and lower surfaces of the gasket body 8 around the periphery of the holes 10 for coolant passages, annular seal rings 15 are bonded or attached by painting. The seal rings 15 are of an elastic and liquid impermeable material such as silicone resin. When the gasket is not incorporated in the engine, the seal ring 15 has a thickness $d_2$ which is larger that the thickness $d_1$ of the ring 13.

The cylinder head gasket 7 constituted as above is put on the cylinder block and then the cylinder head is put on the gasket 7. The cylinder head is fixedly secured through the gasket 7 to the cylinder block by tightening the bolts inserted into the bolt holes 11. In this assembled state, the distance between an end surface 16 of the cylinder block and an end surface 17 of the cylinder head is determined by the thickness of the ring 13 which is intimately contacted by the surfaces 16 and 17 to form a gas-tight seal, as shown by a chain line in FIG. 3, with the protruded portions of the elastic rings 15 being compression deformed to form liquid impermeable sealings for the coolant passages 10.

Figure 1:
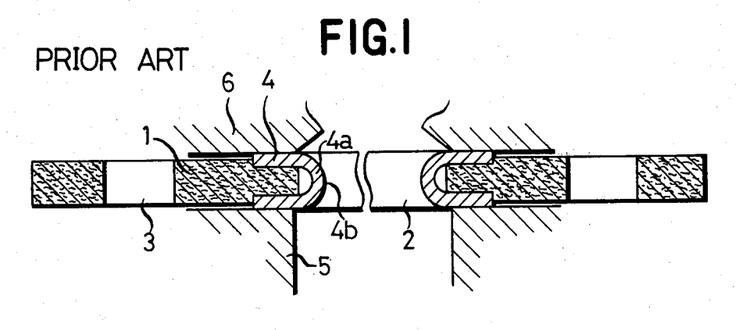
FIG. 1 is a cross sectional view of the conventional cylinder head gasket.

In this embodiment, since the grommet is made from not a thin metal sheet as shown in FIG. 1 but a thick and rigid ring, the mechanical strength thereof is considerable compared with the conventional grommet in FIG. 1 and there is no problem of damage. Therefore, it is possible to use copper or aluminum as the material of the ring 13, which has a good thermal conductivity. Further, the ring 13 of this embodiment has such a structure and configuration that the amount of heat transmission is large compared with the conventional grommet in FIG. 1. Therefore, the ring 13 is prevented from being heated up to an abnormally high temperature.

Figure 4:
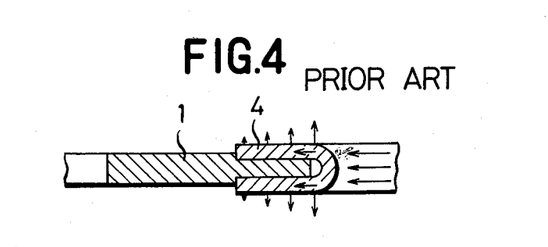
FIG. 4 is a cross sectional view of the conventional cylinder head gasket, showing the heat transmission thereof.
Figure 5:
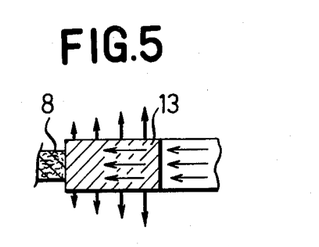
FIG. 5 is a cross sectional view of the gasket in FIG. 3, showing the heat transmission thereof.

FIGS. 4 and 5 illustrate flows of heat generated in the combustion chamber of the engine and dissipated through the conventional grommet in FIG. 1 and the ring 13 in FIG. 3 when assembled in the engine in operation, respectively, in which the length of arrow is proportional to the amount of heat flow. As will be clear from a comparison of these figures, the amount of heat radiated from the conventional grommet 4 is small (FIG. 4) while that from the ring 13 is considerably larger (FIG. 5), resulting in an improvement in the heat transmission.

Further, in the construction of the gasket 7 shown in FIG. 3, the ring 13 functions to seal the combustion chamber of the engine and the sealing members 15 of an elastic material are compressed to seal the coolant chamber of the engine. Therefore, the present gasket 7 can serve for the gas-sealing as well as the liquid-sealing, simultaneously.

Figure 6:
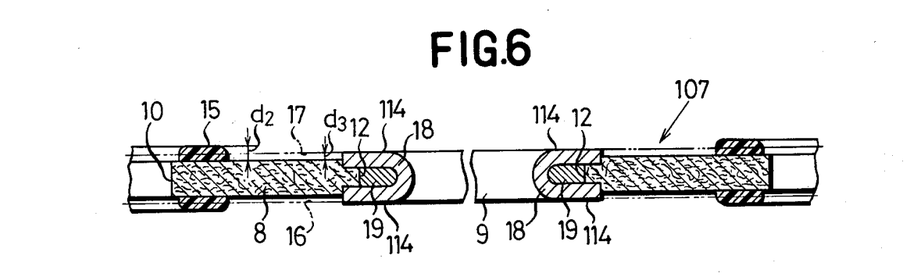
FIG. 6 is a similar view to FIG. 3, showing an area around a hole for a combustion chamber according to another embodiment of the present invention.

FIG. 6 shows another embodiment of the present invention which can provide substantially the same effect as that of the embodiment in FIG. 3. In FIG. 6, the same components as those in FIG. 3 are designated by the same reference numerals as those used in FIG. 3.

In the embodiment shown in FIG. 6, a grommet is composed of an annular grommet member 18 of a metal such as copper or aluminum whose thermal conductivity is relatively large and ring member 19 of a similar metal to that of the grommet member 18. The grommet comprising the grommet member 18 and the ring 19 is fixedly secured to a peripheral surface 12 of the combustion chamber hole 9 of the gasket body 8 made of asbestos. Thus, with this grommet member 18, protruded portions 114 protruding by distance $d_3$ from the upper and lower surfaces of the gasket body 8 are formed around the edge portion of the combustion chamber hole 9. The protrusion distance $d_3$ is smaller than the protrusion distance $d_2$ of the seal members 15 of elastic material such as silicone resin when the gasket 107 is as it is. Since the ring 19 and the grommet member 18 are in intimate face-to-face contact with each other, there is no problem of substantial deformation of the grommet 18 leading to damage. According to this embodiment, since the grommet member 18 exposed to the combustion chamber at high temperature has a bent structure, the grommet 18 is prevented from being locally heated to an abnormally high temperature. Other structural components and configurations of the embodiment in FIG. 6 are the same as those of the embodiment in FIG. 3.

In the two embodiments described hereinbefore, since the ring member 13, 18 whose thickness is larger than that of the gasket body is intimately fitted in the combustion chamber hole of the latter such that the opposite end faces of the ring member are in contact with the end faces of the cylinder block and the cylinder head, respectively, the mechanical strength of that portion is high, so that there is no possibility of damage of that portion due to the high pressure in the explosion stroke of the cylinder, as in the prior art. Therefore, it is possible to use a metal whose thermal conductivity is relatively high as the material of the ring member 13, 18. Further due to the thickness of the ring member 13, 18, the thermal conductivity is further improved. Therefore, the heat radiation of the ring member 13, 18 is good and thus the ring member which is to be exposed to the combustion chamber of the engine is prevented from being heated to abnormally high temperature to thereby prevent the operation of the engine being irregular and any damage due to abnormally high temperature from occuring. Furthermore, since the elastic protruded seal members 15 in the form of rings are provided around the opposite peripheral edge portions of the coolant passage hole of the gasket body, respectively, and the thickness of each of the protruded seal members 15 is selected such that it protrudes from a plane defined by the end face of the ring member 13, 18 fitted in the combustion chamber hole, the gas-sealing for the combustion chamber hole and the liquid-sealing for the coolant passage hole are reliably provided simultaneously.

FIGS. 7 to 11 show embodiments in each of which the gasket body itself is made of a material having a relatively large thermal conductivity so that, together with protruded portions provided in connection with the combustion chamber hole, the heat radiation is further improved. In these figures, the same components as those used in the embodiments in FIGS. 2 and 3 are depicted by the same reference numerals as those used in FIGS. 2 and 3.

Figure 7:
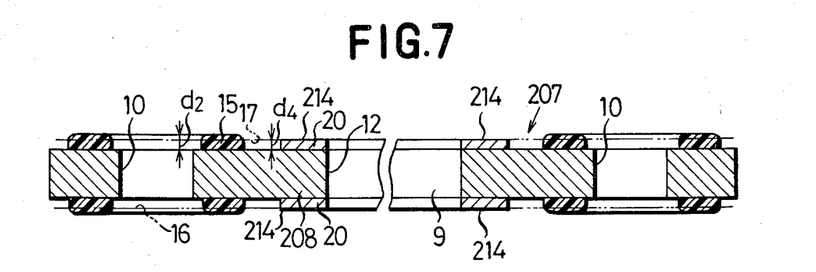
FIG. 7 is a similar view to FIG. 3, showing another embodiment of the present invention.

In FIG. 7, a gasket body 208 of a cylinder gasket 207 is made of a metal such as copper or aluminum whose thermal conductivity is relatively large. The gasket body 208 is formed with the combustion chamber hole 9 and the plurality of the coolant passage holes 10 arranged around the combustion chamber hole 9 as in the embodiments mentioned hereinbefore. The cylinder head gasket 207 is held under pressure between the cylinder head and the cylinder block by means of the bolts passing through the bolt holes (see FIG. 2).

On the opposite surfaces of the gasket body 208 around the combustion chamber hole 9, rings 20 made of a metal such as copper or aluminum whose thermal conductivity is relatively large are fixedly secured, respectively, so that protruded portions 214 are formed around the combustion chamber hole 9 which protrude from the gasket body surfaces by a distance $d_4$ in the opposite directions. The sealing members 15 for the coolant passages in FIG. 7 are the same as those in the former embodiments in object and structure. That is, each of the sealing members 15 protrudes by the distance $d_2$ from each of the opposite surfaces of the gasket body 208 so that it becomes higher than the protruded portion 214 whose height is $d_4$.

As in the former embodiments, when the gasket 207 is assembled in between the cylinder head and the cylinder block by tightening the bolts (not shown), the end faces 16 and 17 of the cylinder block and the cylinder head which are shown by chain lines in FIG. 7 contact the opposite end faces of the protruded portions 214, respectively, to form a gas-seal for the combustion chamber hole 9. Also, as in the former embodiments, the elastic seal members 15 are compressively deformed by the end faces 16 and 17 of the cylinder block and the cylinder head, respectively, to provide the liquid-seals for the coolant passage holes 10.

Figure 8:
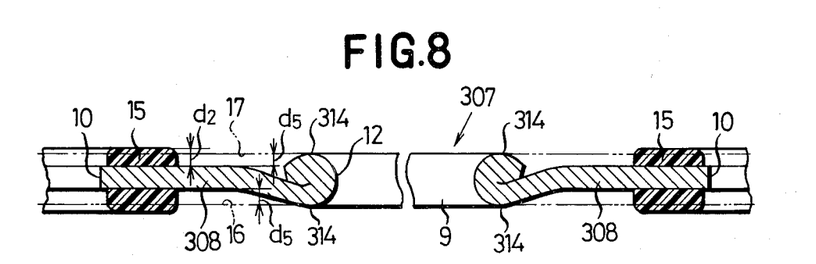
FIGS. 8 through 10 are similar views to FIG. 3, showing other embodiments of the present invention, respectively.

FIG. 8 is a cross section of a portion around the combustion chamber hole 9 of a gasket body 308. In this embodiment, the gasket body 308 is of a metal such as copper or aluminum whose thermal conductivity is relatively large as in the embodiment in FIG. 7. In order to provide planes to be in contact with the end faces 16 and 17 of the cylinder block and the cylinder head, a portion of the gasket body 308 surrounding the combustion chamber hole 9 is turned as shown to thereby form protruded portions 314 which extend along the peripheral surface 12 of the hole 9 for the combustion chamber. The height of each of the protruded portions 314 is $d_5$. The thickness of the sealing members 15 of such material as silcone resin is larger than the protrusion height $d_5$ of the protruded portions 314 as in the case of the former embodiments. According to this embodiment, since the contacting areas of the protruded portions 314 with the end faces 16 and 17 of the cylinder block and the cylinder head are relatively small, the gas-sealing portions which can withstand a relatively high pressure gas can be tightened with relatively large pressure.

Figure 9:
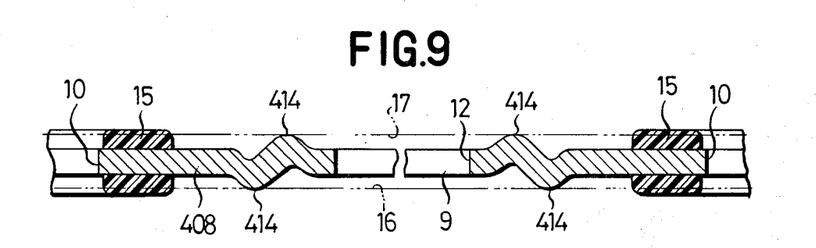

FIG. 9 is a cross section of a combustion chamber hole area of a gasket according to another embodiment of the present invention, in which a gasket body 408 of a metal such as copper or aluminum whose thermal conductivity is large is coaxially corrugared around the combustion chamber hole 9 thereof to thereby form coaxially protruded portions 414. This corrugation of the gasket body 408 may be formed by using the beading or embossing technique. In this embodiment, because the contacting areas of the protruded portions 414 with the end faces 16 and 17 of the cylinder block and the cylinder head are relatively small as in the embodiment in FIG. 8, the tightening pressure becomes large to thereby improve the gas-tight sealing. Other constructional features of this embodiment are the same as those of the embodiment in FIG. 8.

Figure 10:
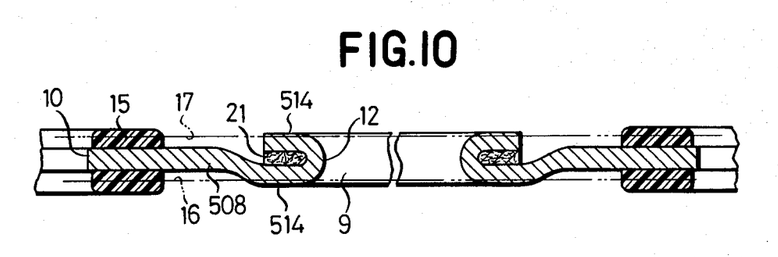

FIG. 10 is a similar figure to FIG. 9, in which a portion of the high thermal conductivity gasket body 508 such as copper or aluminum surrounding the combustion chamber hole 9 is turned to form annular protruded portions 514. A ring 21 of resilient material such as asbestos is inserted into a space formed between the protruded portions 514. By compressively pinching protruded portions 514 between the end faces 16 and 17 of the cylinder block and the cylinder head, the ring 21 is compressed and gas-sealing is provided for the combustion chamber of the engine. Other constitutional components of the embodiment in FIG. 10 are the same as those of the embodiment in FIG. 8.

In the embodiments in FIGS. 8 and 9, each of the protruded portions 314 and 514 surrounding the holes 9 for the combustion chamber are not sharp but curved. Therefore, the effects of preventing an abnormally high temperature from occurring in each of these embodiments are further enhanced, as in the embodiment in FIG. 6.

Figure 11:
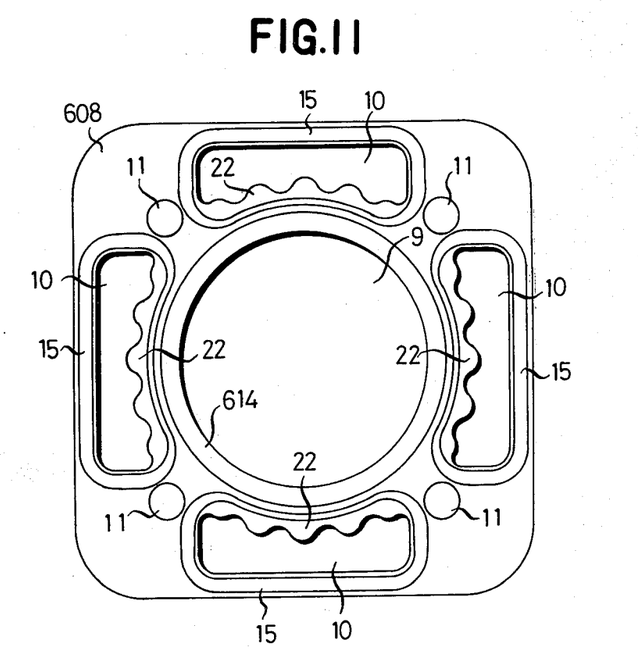
FIG. 11 is a plan view of a gasket according to another embodiment of the present invention in which a fin protrudes in the hole for coolant passage.

FIG. 11 is a plan view of another embodiment of the present invention, in which a fin 22 is provided integrally with an inside portion of the periphery of each coolant passage hole 10 of the gasket body 608 of a high thermal conductivity metal such as copper or aluminum. With the fins 22, the whole contacting area of the gasket body 608 with the coolant is increased and thus the cooling effect of the cylinder head gasket is improved. Further, with the fins 22, turbulences are produced in the coolant passing through the coolant passage holes 10 and thus the amount of heat transmission can be increased. It may be possible to provide the fin 22 on the whole peripheral edge of each hole 10 of the gasket body 608. Further, it may be possible to extend each fin into the coolant passage defined by the cylinder block and the cylinder head. Alternatively, it may be possible to form a plurality of small holes in each fin so that the coolant can flow through these small holes in the coolant passage defined by the cylinder block and the cylinder head. Further, it may be possible to form the fin 22 having a plurality of recesses, as shown in FIG. 11, or it may be possible to roughen the surfaces of the fin 22 by using the sand blasting technique.

The embodiment in FIG. 11 is also provided with protruded portions 614 around the hole 9 for the combustion chamber. The protruded portions 614 may take any of the forms shown in FIGS. 2, 3 and 6 to 10.

As mentioned above, according to the embodiments shown in FIGS. 7 to 11, since the gasket body and the protruded portions provided for the gas-sealing of the combustion chamber are made of a metal material having relatively high thermal conductivity, the heat radiation characteristic thereof is particularly superior. Therefore, the heating of the peripheral portion of the combustion chamber hole of the gasket to an abnormally high temperature is effectively prevented. Further, together with the use of the liquid sealing member and the protrusions thereof, which is made of an elastic and liquid proof material, the gas sealing and the liquid sealing are achieved simultantously as in the embodiments in FIGS. 3 and 6.

In the embodiments shown in FIGS. 3 and 6, the gasket bodies are made of asbestos. Since asbestos is porous, there is a possibility that the liquid coolant leaking from the periphery of the coolant passage will go down to the gasket body causing a leakage of the coolant. FIGS. 12 to 15 show embodiments by which, even if the gasket body is made of porous material such as asbestos, the leakage of the coolant into the gasket body can be prevented. The same structual components of the embodiments in FIGS. 12 to 15 as those of the preceding embodiments are shown in these figures by the same reference numerals as those used for the preceding embodiments.

Figure 12:
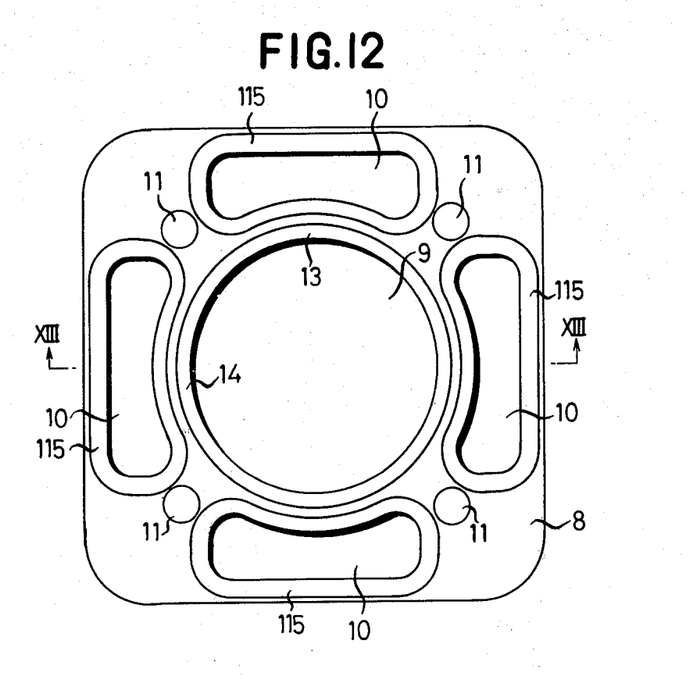
FIG. 12 is a plan view of a further embodiment of the present invention.
Figure 13:
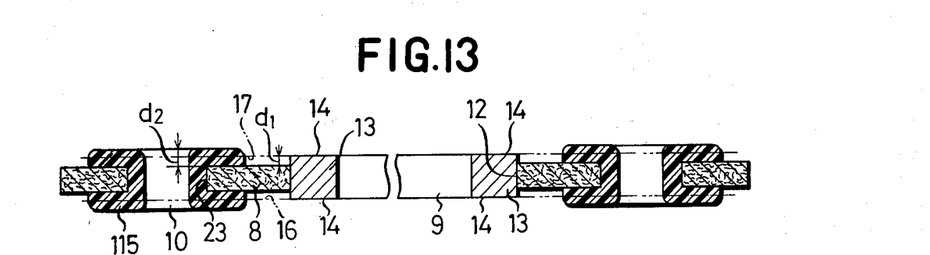
FIG. 13 is a cross section taken along a line XIII—XIII in FIG. 12.

FIG. 12 is a plan view of a gasket similar to that shown in FIG. 2 and FIG. 13 is a cross section taken along a line XIII—XIII in FIG. 12. The gasket body 8 is made of a porous material such as asbestos as in the embodiment in FIG. 3. As in the embodiment in FIG. 3, a ring 13 of a metal such as copper or aluminum whose thermal conductivity is large is attached to an annular wall 12 of the combustion chamber hole 9 so that the protruded portions 14 are formed. A seal member 115 of this embodiment covers the annular walls 23 defining the coolant passage holes 10 of the gasket body 8 and extends vertically from the surfaces of the gasket body 8. The seal members 115 are provided by bonding or painting them on the gasket body. The seal members 115 may be made of an elastic and liquid tight material such as silicone resin, rubber or epoxy resin. The thickness $d_2$ of each of the protruded portions of the seal member 115 is made greater than the thickness $d_1$ of the protruded portions 14 of the ring 13.

When the gasket is assembled in between the cylinder block and the cylinder head so that the protruded portions 14 are pressure-contacted with the end faces 16 and 17 of the cylinder block and the cylinder head, the seal members 115 are also pressure-contacted with these end faces and compressed thereby, so that the liquid sealings for the coolant chambers are achieved as in the embodiment in FIG. 3. In this case, however, since the annular walls 23 of the coolant passage holes 10 are covered by the seal members 115, respectively, the walls 23 are not exposed to the coolant and therefore there is no possibility of leakage of the coolant into the gasket body 8.

Figure 14:
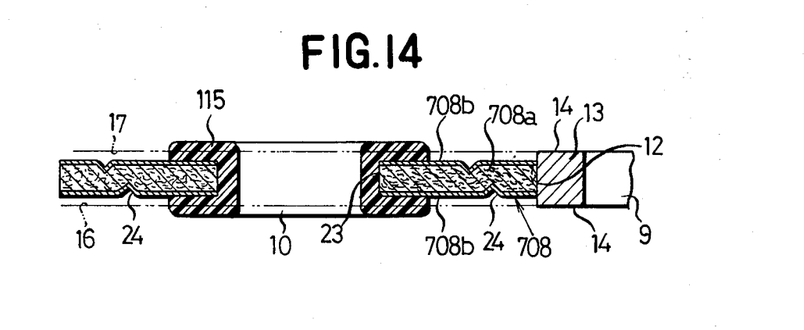
FIGS. 14 and 15 are similar views to FIG. 13, showing still other embodiments of the present invention, respectively.

FIG. 14 is a cross section of a gasket of another embodiment of the invention. In this embodiment, a gasket body 708 is composed of an asbestos plate 708a and plates 708b of a metal such as copper or aluminum provided on the opposite surfaces of the plate 708a, respectively. Each of the metal plates 708b is formed with notches 24 by pressing, to fixedly secure the metal plates 708b to the asbestos plate 708a. Also in this embodiment, seal members 115 similar to those used in the embodiment in FIG. 13 are provided as shown. Therefore, the problem of coolant leakage into the gasket body 708 is also prevented and coolant does not flow through gaps between the asbestos sheet 708a and the metal plates 708b.

Figure 15:
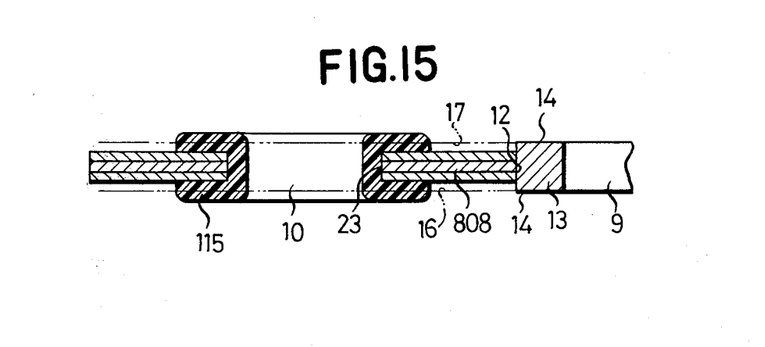

FIG. 15 is a cross section of a gasket according to a further embodiment. In this embodiment, a gasket body 808 is formed by stacking a plurality (three in the shown case) of metal sheets each of copper or aluminum. The construction of the seal members 115 for the coolant passages to be used in this embodiment is the same as that used in the embodiments shown in FIGS. 13 and 14. Therefore, coolant in the coolant passage does not flow through gaps between the metal plates constituting the gasket body 808.

As a modification of the embodiments in FIGS. 12 to 15, the seal member 115 may be provided not by the bonding or painting but by forming it in the form of a grommet having an annular peripheral groove to be fitted on the peripheral edge portion of the coolant passage hole 10 of the gasket body.

It should be noted that the embodiments in FIGS. 12 to 15 may be applied to prevention of liquid leakage other than that in the cylinder head gasket of the liquid cooled internal combustion engine.

As described hereinbefore, according to the embodiments shown in FIGS. 12 to 15, with the provision of the seal member which is liquid-tight and fixedly covers the peripheral edge portion of the coolant passage hole of the gasket body, the leakage of the coolant to the gasket body as well as to the interfaces of the layers forming the gasket body can be prevented. Further, since the seal member protrudes vertically from the opposite surfaces of the gasket body, there is no space provided between the gasket and the end faces of the cylinder head and the cylinder block and, thus, no space through which leakage of the coolant can occur.

What is claimed is:

1. A cylinder head gasket to be disposed between a cylinder block and a cylinder head of a liquid cooled internal combustion engine, comprising a gasket body formed with at least one hole for a combustion chamber of the engine and at least one hole for a coolant passage, protruded portions of a metal having a relatively high thermal conductivity, said protruded portions being disposed around a periphery of said hole for the combustion chamber such that they protrude vertically from opposite surfaces of said gasket body and adapted to be in pressure contact with the cylinder block and the cylinder head and at least one seal member of an elastic and liquid impermeable material, said seal member fixed to and arranged on opposite surfaces of said gasket body around a periphery of said hole for the coolant passage, said seal member protruding vertically from said opposite surfaces of said gasket body, and the height of said seal member being larger than that of said protruded portion.

2. A gasket as claimed in claim 1, wherein said protruded portions are constituted from a ring fixed to a peripheral wall of said hole for the combustion chamber.

3. A gasket as claimed in claim 1, wherein said gasket body is made of a metal having a relatively high thermal conductivity.

4. A gasket as claimed in claim 3, wherein said protruded portions are provided by bending said gasket body around a peripheral portion of said hole for the combustion chamber.

5. A gasket as claimed in claim 3, wherein at least a portion of said gasket body exposed to the coolant passage is formed as a fin.

6. A gasket as claimed in claim 1, wherein said gasket body is made of a porous material and wherein said seal member covers an peripheral wall of said hole for the coolant passage.

7. A gasket as claimed in claim 1, wherein said gasket body is composed of a plurality of layers and wherein said seal member covers said peripheral wall of said hole for the coolant passage.

* * * * *